(12) United States Patent
Ihida et al.

(10) Patent No.: US 6,788,355 B1
(45) Date of Patent: Sep. 7, 2004

(54) ACTIVE MATRIX LCD PANEL

(75) Inventors: Satoshi Ihida, Tokyo (JP); Hirotaka Yamaguchi, Tokyo (JP); Hiroaki Tanaka, Tokyo (JP); Takasuke Hayase, Tokyo (JP); Hiroshi Kanou, Tokyo (JP); Wakahiko Kaneko, Tokyo (JP); Tae Miyahara, Tokyo (JP); Michiaki Sakamoto, Tokyo (JP); Shinichi Nakata, Kagoshima (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 534 days.

(21) Appl. No.: 09/695,212

(22) Filed: Oct. 25, 2000

(30) Foreign Application Priority Data

Oct. 26, 1999 (JP) ............................................ 11-304682

(51) Int. Cl.[7] .......................................... G02F 1/1343
(52) U.S. Cl. ........................................................ 349/43
(58) Field of Search ............................................. 349/43

(56) References Cited

U.S. PATENT DOCUMENTS

| | | | | |
|---|---|---|---|---|
| 5,917,564 A | * | 6/1999 | Kim et al. ..................... 349/46 |
| 6,016,174 A | * | 1/2000 | Endo et al. ..................... 349/43 |
| 6,128,060 A | * | 10/2000 | Shimada et al. ............. 349/138 |
| 6,335,717 B2 | * | 1/2002 | Hasegawa et al. ............. 345/97 |
| 6,380,559 B1 | * | 4/2002 | Park et al. ..................... 257/59 |

FOREIGN PATENT DOCUMENTS

| | | |
|---|---|---|
| JP | 63-218925 | 9/1988 |
| JP | 9-73101 | 3/1997 |
| JP | 9-92838 | 4/1997 |
| JP | 11-38440 | 2/1999 |
| JP | 11-64891 | 3/1999 |
| JP | 11-163356 | 6/1999 |

OTHER PUBLICATIONS

Japanese Office Action dated Sep. 3, 2002 with partial English translation.

* cited by examiner

Primary Examiner—Tarifor R. Chowdhury
Assistant Examiner—P. R. Akkapeddi
(74) Attorney, Agent, or Firm—McGinn & Gibb, LLC

(57) ABSTRACT

A method for fabricating an active matrix LCD panel for use in an active matrix LCD device includes the step of forming a passivation layer acting as a channel protection layer for protecting an amorphous silicon active layer, thereby reducing the number of photolithographic steps. A transparent conductive film is used for forming a gate electrode and a pixel electrode before formation of an amorphous silicon film for the TFTs.

17 Claims, 15 Drawing Sheets

US 6,788,355 B1

ACTIVE MATRIX LCD PANEL

BACKGROUND OF THE INVENTION

(a) Field of the Invention

The present invention relates to an active matrix LCD panel and a method for fabricating the active matrix LCD panel. More particularly, the present invention relates to a channel protection type active matrix LCD panel in which a channel protection film is formed on a surface of an amorphous silicon (a-Si) active layer, and a method for fabricating the channel protection type active matrix LCD panel.

(b) Description of the Related Art

An active matrix mode liquid crystal display (LCD) device including an active element such as a thin-film transistor (TFT) has advantages of small thickness and light weight, and has been widely used as a high quality flat panel display unit. In general, the LCD device is either of a longitudinal electric field (twisted nematic: TN) mode wherein liquid crystal layer interposed between an active matrix LCD panel and a counter panel respectively mounting thereon transparent electrodes is driven by a voltage applied between the transparent electrodes, or of an in-plane switching mode where a liquid crystal is driven by comb-shaped electrodes formed on the active matrix LCD panel for generating transverse electric field which is parallel to the surface of both the panels. In either mode LCD device, attempts to simplify the fabrication process of the active matrix LCD panel have been made in order to realize a lower price.

Referring to FIG. 1 showing a typical TN mode active matrix LCD panel generally includes: gate lines 12 and drain lines 14 respectively extending in directions perpendicular to each other; pixel electrodes 10 each formed in a pixel area surrounded by these lines; and thin-film transistors (TFTs) 17 each formed in the vicinity of an intersection between the gate line 12 and the drain line 14. The source of each TFT is coupled to a gate line of next row via a gate storage capacitor having a gate storage electrode 21 and connected in parallel with the pixel capacitor formed by a liquid crystal layer. Each drain line 14 as well as each gate line 12 is protected by a protective device 18 including first and second TFTs 41 and 42 disposed in the vicinity of the electrode pad, i.e., gate terminal 15 or drain terminal 16. A channel protection film is formed on the surface of the thin-film transistor 17 in order to secure the performance thereof. An orientation film (not shown) for aligning the liquid crystal layer in a predetermined direction is formed on each of the thin-film transistor 17 and the pixel electrode 10 of the active matrix LCD panel. The liquid crystal lays is sandwiched between the active matrix LCD panel and the counter panel, on which a color filter, a common electrode, an orientation film, and the like are formed, to implement an active matrix LCD device.

A general fabrication method for such an active matrix LCD panel will be described below. First, an ITO (Indium-Tin-Oxide) film is formed by deposition onto a transparent insulating substrate, and a resist pattern is formed on the ITO film by using a first mask pattern (or a first photolithographic step using a mask pattern). The ITO film is selectively etched by using the resist pattern to form pixel electrodes. Thereafter, a metallic film such as made of Cr, Mo, or Al to be formed as gate electrodes is formed by deposition onto the transparent insulating substrate. Another resist pattern is then formed on the metallic film by using a second photolithographic technique, followed by selective etching of the metallic film to form gate electrodes.

Subsequently, a gate insulating film such as made of SiNx is formed by deposition to cover the gate electrodes, followed by selecting etching thereof to form openings therein by using a third photolithographic step. An a-Si layer is then formed thereon by deposition. Next, the a-Si layer is selectively etched by using a fourth photolithographic step to form a plurality of island a-Si layers, and a channel protection film such as made of SiNx is formed on the island a-Si layers by deposition. Using a fifth photographic process, the channel protection film is selectively etched to leave portions of the channel protection film on the island a-Si layers. Next, in order to obtain ohmic contact with the a-Si layer, an impurity-doped $n^+$type a-Si layer is deposited thereon, and a metal such as Cr, Mo, or Al is subsequently deposited thereon. Then, a sixth photolithographic step is conducted to form source/drain electrodes of the TFTs.

In the process for fabrication of the active matrix LCD panel, six photolithographic steps using six mask patterns are conducted in total for completion of the active matrix LCD panel. In view of simplification of the fabrication process for the active matrix LCD panel, it has been proposed to reduce the large number of the photolithographic steps in the fabrication process.

Japanese Patent Laid-Open Publication No. Sho 63-218925, for example, describes a fabrication process for reducing the number of the photolithographic steps, which is described below with reference to FIGS. 2A to 2D schematically illustrating steps of the method for fabricating the TN mode active matrix LCD panel in sections. The left side of each of the figures shows the peripheral area of the panel where gate terminals are disposed, and the centers thereof show a single pixel disposed in the pixel area.

In the active matrix LCD panel described in the above-mentioned publication, first, an ITO film and a metallic film such as made of Cr, Mo, or Al are consecutively deposited onto a transparent insulating substrate 31, as illustrated in FIG. 2A, by a sputtering technique, and a resist pattern is formed thereon using a first photolithographic step. The ITO film and the metallic film are selectively etched by using the resist pattern to simultaneously form gate electrodes 32 and pixel electrodes 10.

Next, as illustrated in FIG. 2B, after a gate insulating film 34 such as made of SiNx, an intrinsic or undoped a-Si layer 35, and a channel protection film 25 such as made of SiNx are consecutively deposited, followed by selective etching of the channel protection film 25 to leave portions of the channel protection film 25 on the channel region of the undoped a-Si layer 35.

Next, as illustrated in FIG. 2C, an ohmic contact layer 36 made of impurity-doped $n^+$-type a-Si is deposited thereon, and the ohmic contact layer 36, the undoped a-Si layer 35, the gate insulating film 34, and the upper layer gate metallic film 32b are selectively etched all together using a third photolithographic step to expose pixel electrodes 10 and electrode pads for the gate electrode 32.

Thereafter, as illustrated in FIG. 2D, a source/drain metallic film such as made of Al is formed thereon by deposition. Subsequently, the source/drain metallic film and the ohmic contact layer 36 above the channel region are selectively etched using a fourth photolithographic step, and the source/drain metallic film is configured to a specific shape, thereby completing the fabrication of the active matrix LCD panel.

In the method of the above publication, it is possible to fabricate the active matrix LCD panel in which the channel protection film 25 is formed in the channel region above the undoped a-Si layer 35 by using the four photolithographic steps. However, since the ohmic contact layer 36, the undoped a-Si layer 35, the gate insulating film 34, and the upper layer gate metallic film 32b are selectively etched all together in the single step as illustrated in FIG. 2C after the formation of the channel protection film 25, the side surfaces of the undoped a-Si layer 35 are not covered and thus not protected by the channel protection film 25.

The side walls of the undoped a-Si layer 35 not protected by the channel protection film 25 made of a fine material, such as SiNx, is subjected to ingress of impurities from the liquid crystal layer through a coarse film such as a polyimide orientation film alone by diffusion or by an electric field. This significantly deteriorates the characteristics of the TFT having source/drain regions formed in the undoped a-Si active layer 35. In order to avoid this problem, in the current active matrix LCD panel, a passivation film is formed so as to cover the side surfaces of the undoped a-Si layer 35 after the step illustrated in FIG. 2D. In such a case, another (fifth) photolithographic step should be conducted to the passivation film for exposing therethrough the gate terminals, drain terminals, and pixel electrodes. Thus, the number of photolithographic steps is five, and reduction of the number of photolithographic steps is limited.

SUMMARY OF THE INVENTION

A primary object of the present invention is to solve the above problem and provide a channel protection type active matrix LCD panel capable of covering the entire surface of the a-Si layer by the passivation film by using less number of photolithographic steps, and also to provide a method for fabricating the active matrix LCD panel.

The present invention provides an active matrix LCD panel for use in an active matrix LCD device including a transparent insulating substrate, a plurality of pixels arranged on the transparent insulating substrate and each including a pixel electrode and an associated TFT, and a passivation layer covering the plurality of pixels, the TFT having a gate electrode including a transparent conductive film and a metallic film consecutively formed on the transparent insulating substrate, a gate insulating film covering the gate electrode, an island amorphous silicon (a-Si) layer formed on the gate insulating film, and source and drain electrodes, the passivation layer covering side surface and top surface of the a-Si layer and having openings therein, the source and drain electrodes being in contact with the a-Si layer through the respective openings of the passivation layer, the pixel electrode including a transparent conductive film formed in a common layer with the transparent conductive film of the gate electrode, the source electrode being in contact with the transparent conductive film of the pixel electrode through the opening of the passivation layer.

In accordance with the active matrix LCD panel of the present invention, since the passivation layer covering the side surface and the top surface of the a-Si layer functions as a channel protection layer, the number of photolithographic steps in the fabrication process for the channel protection type LCD panel can be reduced down to four, which simplifies the fabrication process for the active matrix LCD panel.

The present invention also provides a method for manufacturing an active matrix LCD panel including the consecutive steps of:

depositing consecutively a transparent conductive film and a metallic film thereon, and selectively etching the transparent conductive film and the metallic film by a first photolithographic step using a first mask pattern to from gate electrodes and pixel electrodes;

depositing consecutively a gate insulating film and an a-Si layer thereon, and selectively etching the gate insulating film and the a-Si layer by a second photolithographic step using a second mask pattern to form island a-Si layers and gate insulating films;

depositing a passivation film thereon to cover top and side surfaces of the island a-Si layers, and selectively etching the passivation film by a third photolithographic step using a third mask pattern to form openings therein for exposing portions of the island a-Si layers and the pixel electrodes; and depositing an electrode film thereon, and selectively etching the electrode film by a fourth photolithographic step using a fourth mask pattern to form electrodes in contact with the portions of the island a-Si layers and the pixel electrodes.

In accordance with the method of the present invention, the number of photolithographic steps can be reduced to four, which simplifies the fabrication process for the active matrix LCD panel.

The above and other objects, features and advantages of the present invention will be more apparent from the following description, referring to the accompanying drawings.

DETAILED DESCRIPTION OF PREFERRED EMBODIMENTS

Figure 1:
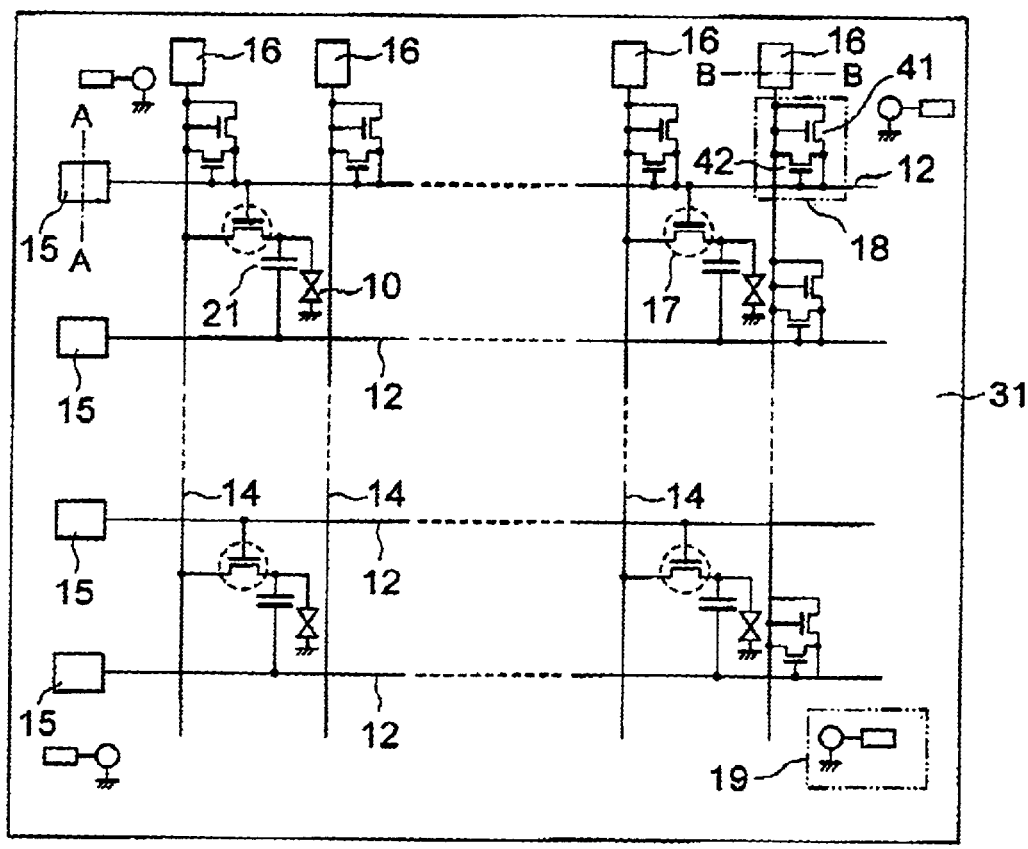
FIG. 1 is a circuit diagram of a typical TN-mode active matrix LCD panel used in an active matrix LCD device.
Figure 2A:
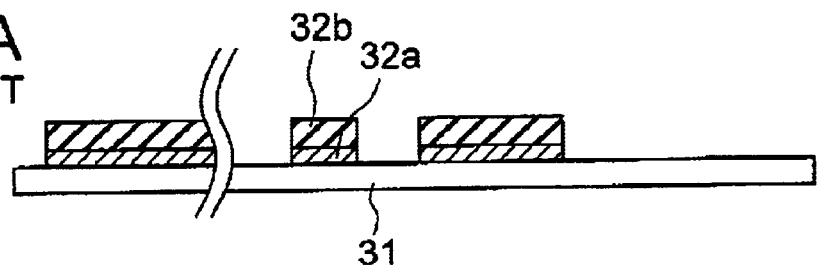
FIGS. 2A to 2D are sectional views of a conventional active matrix LCD panel consecutively showing fabrication steps thereof.
Figure 2B:
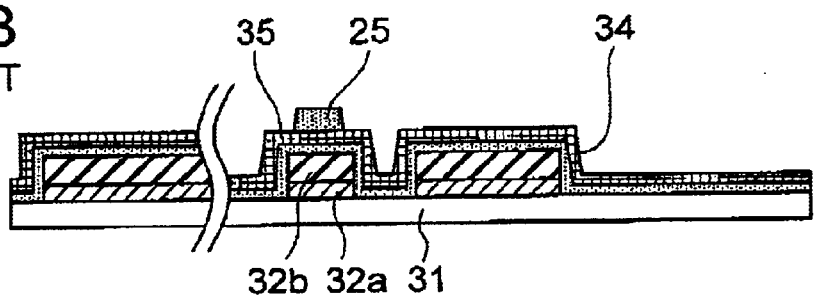
Figure 2C:
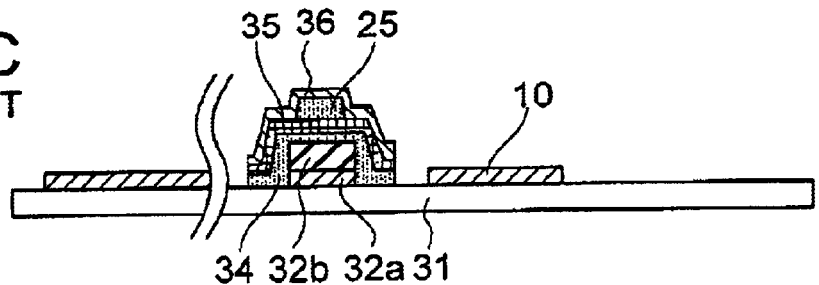
Figure 2D:
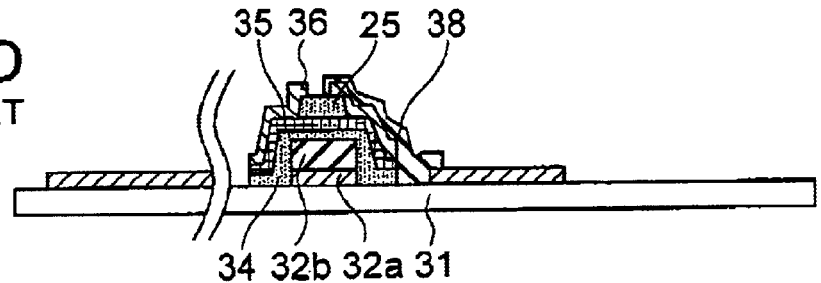
Figure 3A:
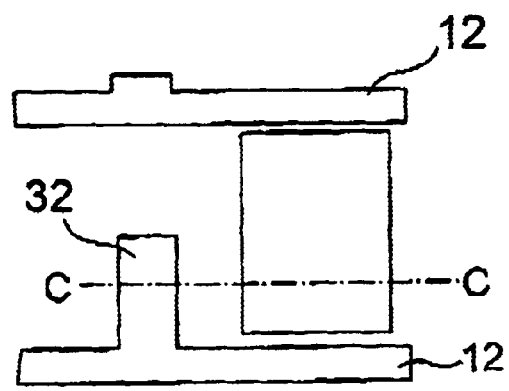
FIGS. 3A to 3D are front views of an active matrix LCD panel according to a first embodiment of the present invention, consecutively showing fabrication steps thereof.
Figure 3B:
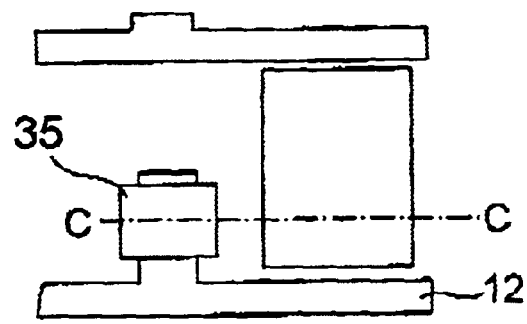
Figure 3C:
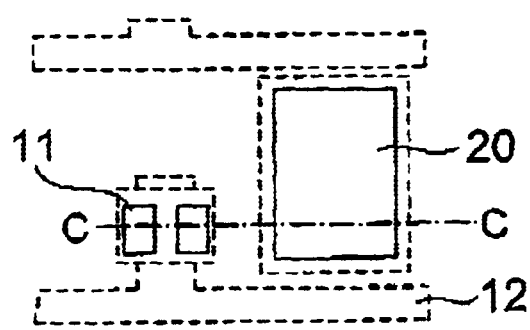
Figure 3D:
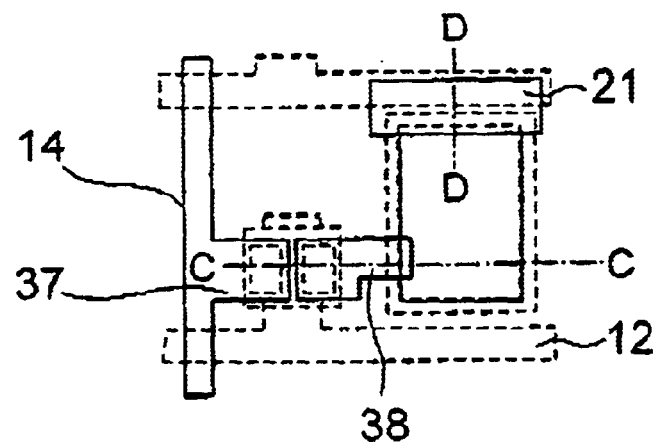

A method for manufacturing an active matrix LCD panel according to a preferred embodiment of the present invention includes the steps of: consecutively depositing a transparent electrode film and a metallic film on a transparent insulating substrate; forming gate electrodes including an upper layer and a lower layer (such as 32b and 32a shown in FIG. 4A) and pixel electrodes by using a first photolithographic step conducted to the transparent electrode film and the metallic film; consecutively depositing a gate insulating film (such as 34 in FIG. 4B) and an undoped a-Si active layer (such as 35 in FIG. 4C) on the upper layer gate electrode 32b; selectively etching the gate insulating film and the undoped a-Si layer simultaneously to configure into a predetermined shape by using a second photolithographic step; depositing a passivation film (such as 39 in FIG. 4C) on the entire surface so as to cover the upper surface and side surfaces of the undoped a-Si layer, selectively etching the passivation film to form specific openings by using a third photolithographic step; depositing electrode layers (such as 37 and 38 in FIG. 4D) thereon; and forming an interconnect pattern by using a deposition step and a fourth photolithographic step. In the preferred fabrication process, a channel protection type active matrix LCD panel in which the undoped a-Si layer is safely covered by the passivation film is obtained by using four photolithographic steps.

Now, the present invention is more specifically described with reference to accompanying drawings, wherein similar constituent elements are designated by similar reference numerals.

(Embodiment 1)

An active matrix LCD panel according to a first embodiment of the present invention has a circuit configuration similar to that shown in FIG. 1, and the description of the conventional LCD panel with reference to FIG. 1 is incorporated herein by reference. The LCD device having the LCD panel of the present embodiment is a TN-mode active matrix LCD device wherein the liquid crystal layer is driven a longitudinal electric field between the orientation films formed on the active matrix LCD panel and a counter panel. The LCD panel is of a channel protection type wherein the undoped a-Si layer is covered by a passivation film at the side surfaces and the top surface thereof.

A method for fabricating the active matrix LCD panel according the present example will be now described with reference to FIGS. 3A to 3D and FIGS. 4A to 4D, wherein these drawings show a single pixel among the matrix of the pixels. Each of FIGS. 4A to 4D additionally shows a gate terminal taken along line A—A in FIG. 1 at the left side of the drawing, and a drain terminal taken along line B—B in FIG. 1 at the right side of the drawing, with the center thereof showing the single pixel.

Figure 4A:
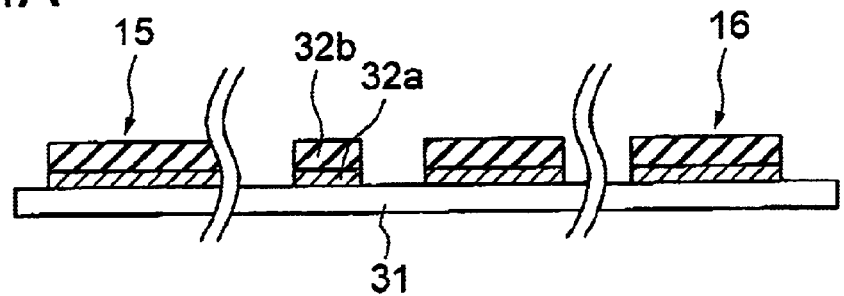
FIGS. 4A to 4D are sectional views taken along lines C—C in FIGS. 3A to 3D, respectively.

First, as illustrated in FIG. 4A, a transparent electrode (ITO) film and a metallic film such as made of Cr, Ti, Mo, or Al are sequentially deposited in this order on a transparent insulating substrate 31 such as made of glass. For example, the ITO film is deposited up to a thickness about in the range of 30 to 100 nm, and the metallic film is deposited up to a thickness about in the range of 0.1 to 0.3 $\mu$m by using a sputtering technique. Thereafter, a resist pattern is formed covering regions for pixel electrodes 10, gate electrodes 32, and gate lines 12 using a mask pattern having a shape illustrated in FIG. 3A. The metallic film and the ITO film is selectively etched using a wet etching and the resist pattern.

Figure 4B:
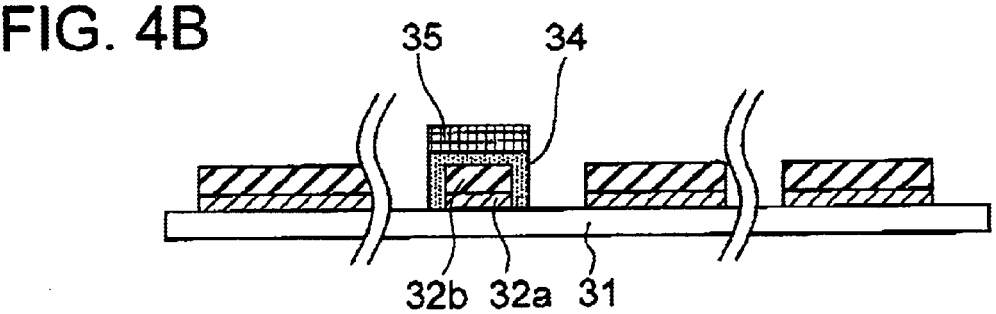

Next, a gate insulating film 34 such as made of SiNx and an undoped a-Si active layer 35 are consecutively formed on the entire surface of the transparent insulating substrate 31 by a plasma-enhanced CVD technique, or the like. The thickness of the SiNx film is preferably about in the range of 0.3 to 0.5 $\mu$m, and the thickness of the a-Si layer is preferably about in the range of 0.05 to 0.2 $\mu$m. After the formation of these films, a resist pattern is formed using a second photolithographic step so as to cover the gate electrodes. Thereafter, unnecessary portions of the undoped a-Si layer 35 and the gate insulating film 34 are etched by dry etching. Thus, the structure as illustrated in FIG. 4B is obtained.

Figure 4C:
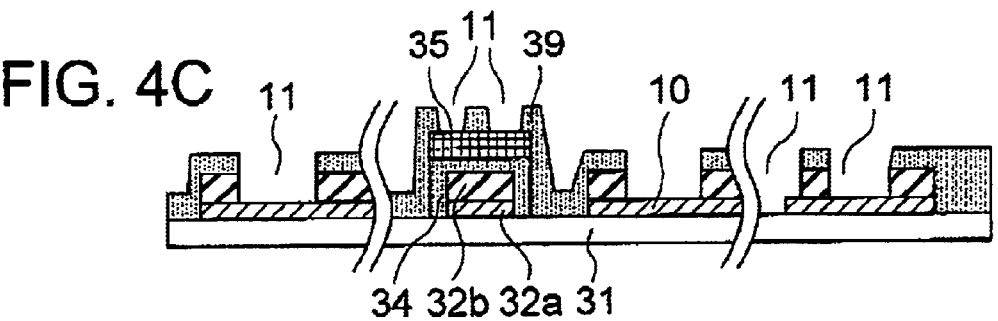
Figure 4D:
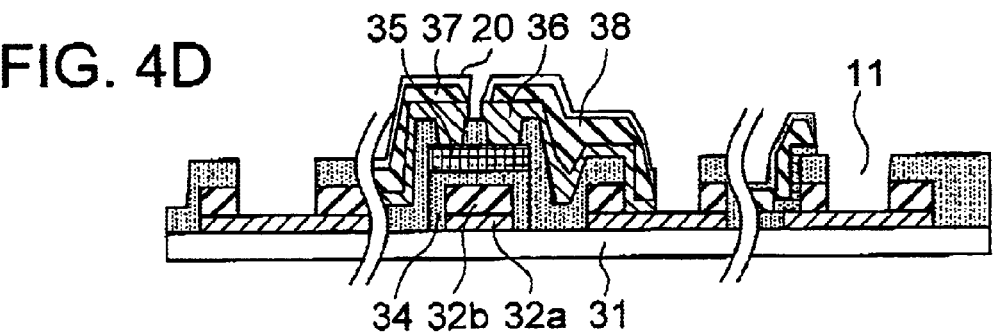

After cleaning the resultant structure with diluted hydrofluoric acid, a passivation film 39 such as made of SiNx which is to be a channel protection film for TFTs 17 is formed on the entire surface of the substrate 31 by a plasma-enhanced CVD technique so as to have a thickness about in the range of 0.1 to 0.4 $\mu$m. Thereafter, a resist pattern is formed using a third photolithographic step to have patterns for contact holes 11 at a source/drain junction on the undoped a-Si layer 35, the pixel electrode 10, gate terminals 15, and drain terminal 16. Next, the exposed passivation film 39 is removed by dry or wet etching, and only the gate metallic films in the pixel electrode 10, the gate terminals 15, and the drain terminals 16 are removed by dry or wet etching so as to expose the ITO film. Thus, the structure illustrated in FIG. 4C is obtained.

Next, in order to achieve ohmic contact with the undoped a-Si layer 35, an ohmic contact layer 36 made of n$^+$-type a-Si doped with impurities is formed in a thickness of about 20 to 100 nm, for example, by a CVD technique. Subsequently, a barrier film such as made of Cr, Mo, or Ti and a metallic film such as made of Al to be source/drain electrodes 7 and 8 are respectively formed, for example, in a thickness of about 0.1 to 0.3 $\mu$m by a sputtering technique.

Instead of forming the ohmic contact layer 36 in order to obtain ohmic contact with the a-Si layer, the ohmic contact between the undoped a-Si layer 35 and the source/drain electrodes 37 and 38 can be similarly obtained by leaving the panel in a PH$_3$ plasma ambient after the formation of openings in the passivation film 39 and by diffusing phosphorus ions into the undoped a-Si layer 35 so as to form an n$^+$-type layer on the undoped a-Si layer 35. The processing conditions are, for example, as follows. The ohmic contact can be achieved by supplying a PH$_3$/H$_2$ (0.5% PH$_3$) gas at 1000 sccm and at a temperature of 300° C. using a plasma CVD system, and performing the treatment for five minutes at a pressure of 200 Pa and a RF power of 0.1 W/cm$^2$.

Next, an unnecessary portion of the source/drain metallic film is etched by using a fourth photolithographic step. The source electrode 38 of the undoped a-Si layer 35 is thus connected with the pixel electrode 10, and a drain line 14 to be connected with the drain electrode 37 is formed. Next, the surface of the drain line is oxidized by oxygen plasma treatment, heat treatment in the oxidizing atmosphere, or the like. By performing such an oxidation treatment, a conductive foreign substance existing in the liquid crystal layer can be prevented from bridging the drain line with the common transparent electrode disposed on the counter panel to cause a short-circuit failure, which may otherwise occur due to a small mechanical shock. By these steps, the active matrix LCD panel having the structure illustrated in FIG. 4D can be fabricated.

Thus, according to the method for fabricating the active matrix LCD panel of the present embodiment, a channel protection mode active matrix LCD panel in which the surface and side walls of the undoped a-Si layer 35 are safely covered by the fine passivation film 9 such as made of SiNx can be formed using four photolithographic steps. That is, the fabrication process can be simplified at least by one photolithographic step as compared to a conventional fabrication process. If the undoped a-Si layer 35 were not covered by the fine passivation film, a defect such as a non-uniformity display would occur due to degradation in the TFT characteristics. According to the present invention, no such defect occurs.

Figure 5A:
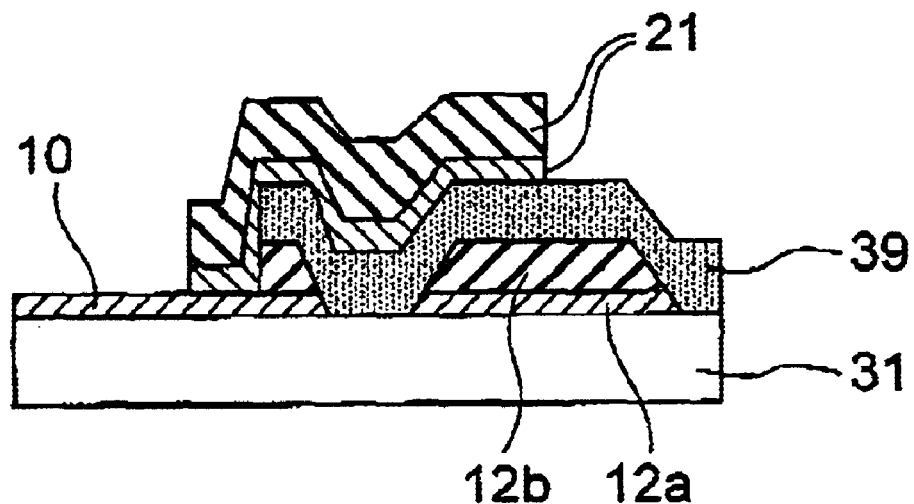
FIGS. 5A and 5B are detailed sectional views of portions of the active matrix LCD panel of the first embodiment.
Figure 14A:
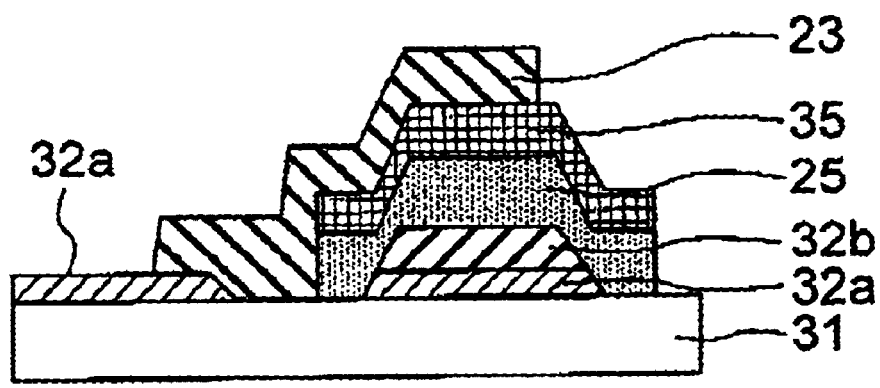
FIGS. 14A and 14B are detailed sectional views of portions of the conventional active matrix LCD panel fabricated by the process shown in FIGS. 2A to 2d.
Figure 14B:
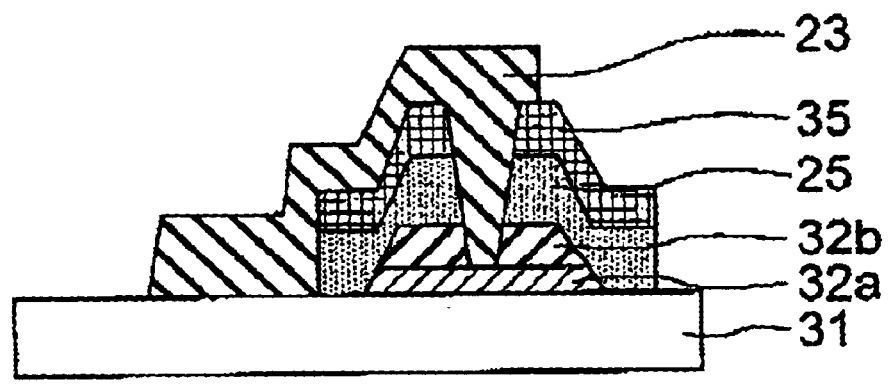

As for the gate storage capacitor fabricated according to the method of the present embodiment, since the gate insulating film 34 has been removed in the step illustrated in FIG. 4C for the gate storage capacitor, as illustrated in FIG. 5A, only the passivation film 39 is interposed between the electrode formed in common layer with the gate electrode 32 and a gate storage electrode 21 formed in common layer with the source electrode 38. Thus, the storage capacitance of the gate storage capacitor can be increased compared to the conventional structure shown in FIG. 14A. In other words, a necessary capacitance can be achieved even when the occupied area for the gate storage capacitor is reduced. Therefore, the aperture ratio of the pixel which is defined by effective pixel area for display to the total pixel area can be increased.

Figure 5B:
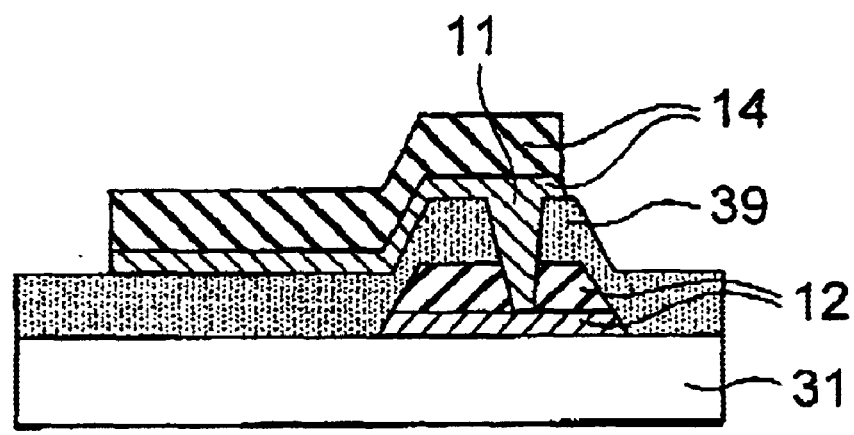

The active matrix LCD panel includes a protection device 18 provided between each drain line 14 and each gate line 12 for preventing electrostatic breakdown of TFTs. The protection device 18 is formed by the same step as that for the TFTs in the pixel, which drive respective pixels. As shown in FIG. 1, the protection device 18 includes a first TFT 41 having a gate and a drain connected to the drain line 14 and a source connected to the gate line 12, and a second TFT 42 having a gate and a source connected to the gate line 12 and a drain connected to the drain line 14. In order to form the protection device 18, the gate metallic film and the source/drain metallic film should connected through the passivation film 39. This is achieved by selectively etching the gate insulating film 34 together with the passivation film 39 in the step illustrated in FIG. 4C, and forming the ohmic contact layer 36 and the drain line 14 and the step illustrated in FIG. 4D, whereby the drain lines 14 and the gate lines 12 are connected with each other via the ohmic contact layer 36 as shown in FIG. 5B. Thus, the protection device 18 for preventing electrostatic breakdown of pixel TFTs can be fabricated without increasing the number of photolithographic steps. While the oxidation treatment is conducted to the drain lines 14 as described before, the surfaces of the gate storage electrode 21 are simultaneously oxidized. In FIG. 5B, the oxide film is not specifically depicted.
(Embodiment 2)

Next, a channel protection type active matrix LCD panel and a method for fabricating such an active matrix LCD panel according to the second embodiment of the present invention will be described with reference to FIGS. 6A to 6D. The left portion in each of these figures shows a gate terminal 15 in section taken along line A—A in FIG. 1, the center portion shows a single pixel in section taken along line C—C in FIGS. 3A to 3D, and the right portion shows a drain terminal 16 in section taken along line B—B in FIG. 1. The second embodiment is similar to the first embodiment except that an organic interlayer dielectric film is formed, in the present embodiment, on the passivation film 39 which is formed as a channel protection film, thereby flattening the top surface of the active matrix LCD panel. The other structures, materials, film thicknesses, fabrication methods, and the like are similar to those in the first embodiment.

In fabrication of the LCD panel of the present embodiment, first, a two-layer structure including an ITO film and a metallic film such as made of Cr, Ti, Mo and Al is formed by deposition, from which the gate electrodes 32, the pixel electrodes 10, and the gate/drain terminals 15 and 16 are formed on the transparent insulating substrate 31 by using a first photolithographic step. After depositing the gate insulating film 34 and the undoped a-Si layer 35, patterning is conducted using a second photolithographic step to obtain the structure wherein the gate insulating film 34 covers the gate electrode 32. The passivation film 39 is formed in a thickness of 0.1 to 0.4 $\mu$m as in the first embodiment, which is sufficient for a channel protection fabrication. The organic interlayer dielectric film 26 additionally deposited on the passivation film 39 functions for flattening the top surface of the panel in the present embodiment.

Figure 6A:
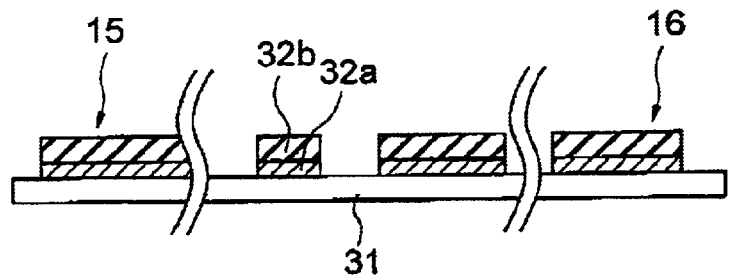
FIGS. 6A to 6D are sectional views of an active matrix LCD panel according to a second embodiment of the present invention, consecutively showing a fabrication steps thereof.
Figure 6B:
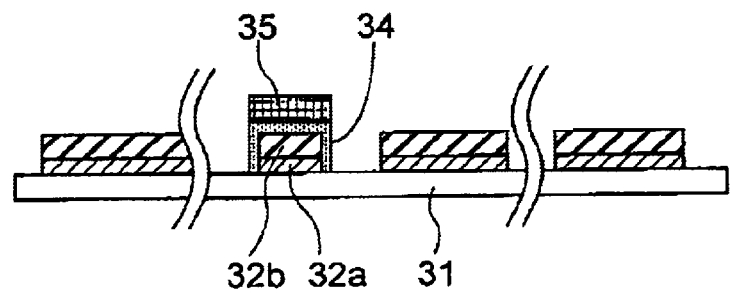
Figure 6C:
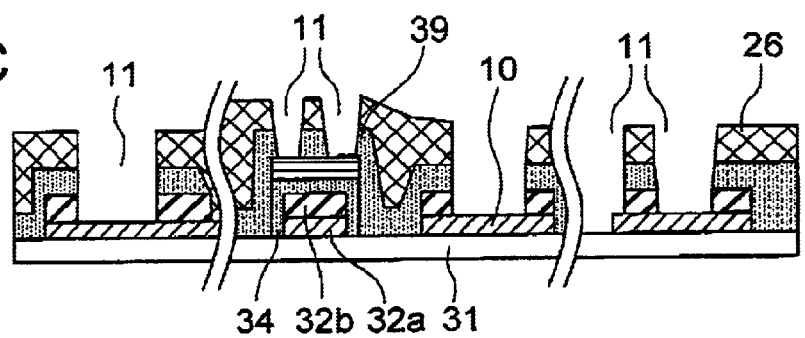
Figure 6D:
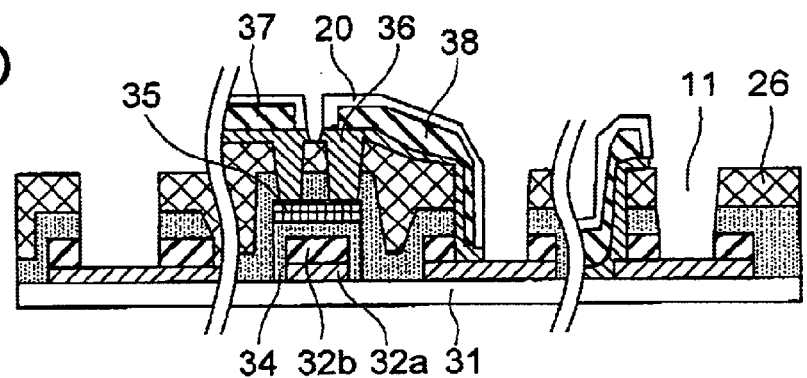

As the organic interlayer dielectric film, an organic material such as an acrylic resin, benzocyclobutene (BCB), or polyimide, for example, is used. By depositing such an organic material so as to have a thickness of about 0.2 to 1.0 $\mu$m, the active matrix LCD panel can be flattened, as illustrated in FIG. 6C. By providing such an organic interlayer dielectric film 26 for flattening, the initial alignment of the liquid crystal layer can be maintained uniform irrespective of the level differences formed in the pixel TFT 17. The organic dielectric film may be replaced by a silicon oxide film.

As another method for flattening the panel (although not shown in the figures), there exists, for example: a method for forming a film having a coarse property by changing deposition conditions such as an SiNx deposition rate of the passivation film 39, a deposition temperature, or the like; a method for forming a two-layered structure in which a coarse SiNx film is provided on a fine SiNx film; or a method for depositing a plurality of films each made of a different material, e.g., $SiO_2$, or the like, on a fine SiNx.

The method for forming a $SiO_2$ film on a fine SiNx having a fine property will be described below. As deposition conditions, first, SiNx is deposited so as to have a thickness of about 0.1 $\mu$m at a deposition rate of about 0.1 $\mu$m/min. by a CVD technique in the same manner as that in the first embodiment. Thereafter, $SiO_2$ is deposited so as to have a thickness of about 1 $\mu$m at a deposition rate of about 0.5 $\mu$m/min. by a CVD technique. As a result, the passivation film 39 can be formed so as to alleviate the level difference at the edge of the undoped a-Si layer 35, and thus, a similar advantage as obtained by the organic interlayer dielectric film 26 can be achieved.

If the deposition rate of SiNx is to be changed, the flattening of the panel can be achieved by increasing the deposition rate of SiNx to about 0.5 $\mu$m/min., instead of the ordinary deposition rate of about 0.1 $\mu$m/min. By increasing the deposition rate in this way, the deposition time can be reduced.

If it is considered that the function of the coarse SiNx film is reduced as an insulating film, a fine SiNx film is first deposited as an underlying film at an ordinary deposition rate to have a thickness of about 0.1 $\mu$m. Next, an SiNx film is deposited at an increased deposition rate to have a thickness of about 1 $\mu$m. Accordingly, both the channel protection function and the flattening function can be obtained.

After depositing the passivation film 39 and the organic interlayer dielectric film 26, contact holes 11 are provided at predetermined positions using a third photolithographic step. Next, the ohmic contact layer 36 made of $n^+$-type a-Si doped with impurities and a metallic film such as made of Cr, Ti, Mo, or Al are consecutively deposited. A fourth photolithographic step is then conducted to configure a specific structure, thereby completing the active matrix LCD panel having a structure illustrated in FIG. 6D. The second embodiment is similar to the first embodiment in that an n$^+$-type layer can be formed by diffusing phosphorus ions into the surface of the undoped a-Si layer 35 instead of forming the ohmic contact layer 36.

Thus, according to the fabrication method of the present embodiment, protection of the undoped a-Si layer 35 can be further assured, and level differences in the pixel TFTs can be reduced, in addition to the effects obtained by the first embodiment. Thus, the flattening of the underlying layer due to the reduced level differences can realize the flattening of the surface of the orientation film and the prevention of misalignment of the liquid crystal layer which otherwise occurs due to the level differences. Therefore, the effect of obtaining an excellent alignment of the liquid crustal layer can be realized.

(Embodiment 3)

Figure 7:
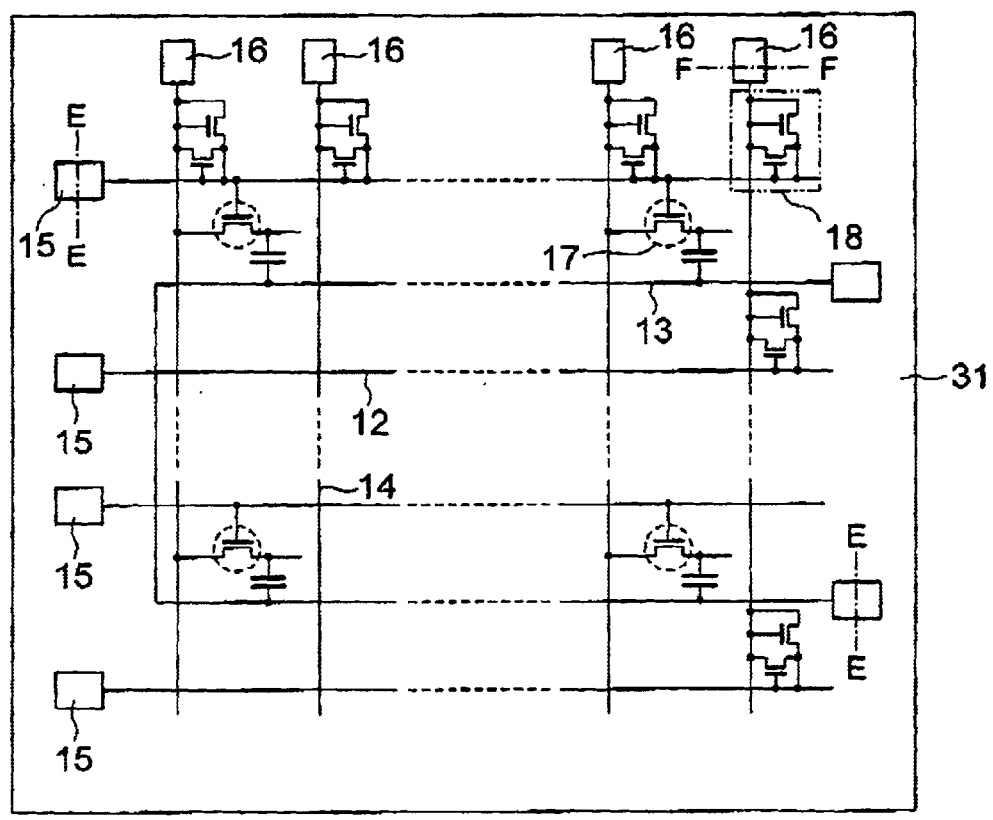
FIG. 7 is a circuit diagram of an in-plane switching (IPS) mode active matrix LCD panel according to a third embodiment of the present invention.

Referring to FIG. 7, a channel protection type active matrix LCD panel according to the present embodiment is of an in-plane switching mode and mounts thereon the pixel electrode and the common electrode opposing each other in each pixel area with comb-shape electrode branches.

Figure 8A:
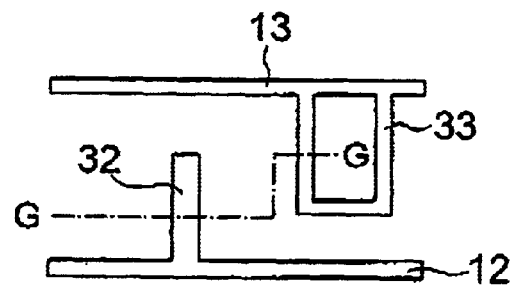
FIGS. 8A to 8D are front views of the active matrix LCD panel of the third embodiment, consecutively showing fabrication steps thereof.
Figure 8B:
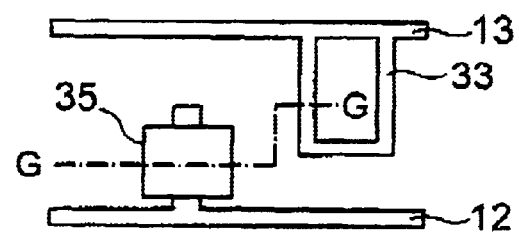
Figure 8C:
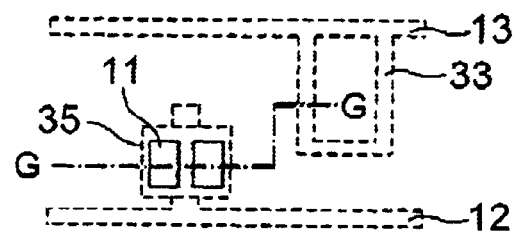
Figure 8D:
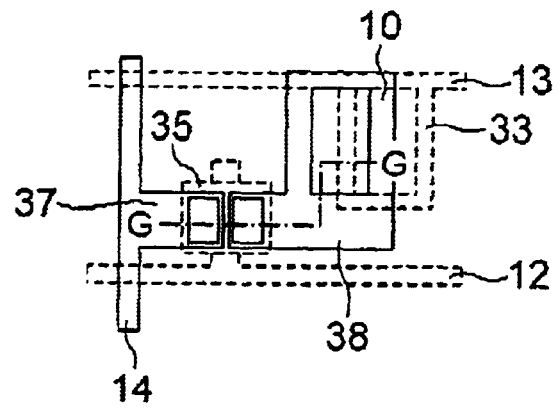
Figure 9A:
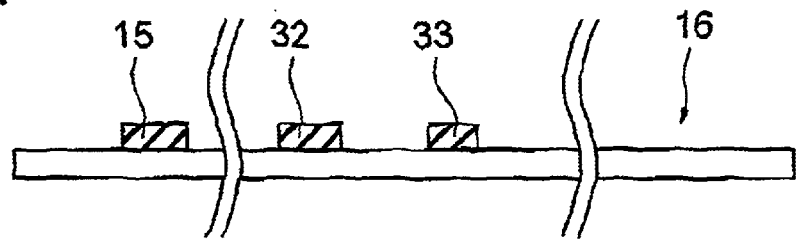
FIGS. 9A to 9D are sectional views taken along line G—G in FIGS. 8A to 8D, respectively.

The method for fabricating the LCD panel of the present embodiment will be described with reference to FIGS. 8A to 8D and FIGS. 9A to 9D which are similar to FIGS. 3A to 3D and FIGS. 4A to 4D for the first embodiment. In FIG. 9A, a metallic film such as made of Cr, Ti, Mo, or Al, which is to be configured as the comb-shaped common electrode 33 and the comb-shape gate electrode 32, is deposited on the transparent insulating substrate 31 by a sputtering technique to have a thickness about in the range of 0.1 to 0.3 $\mu$m. Thereafter, a resist pattern is formed by a first photolithographic step in regions to be formed as the common electrode 33, the drain electrode 37, and the drain line 14. An unnecessary portion of the metallic film is removed by selective wet etching.

Figure 9B:
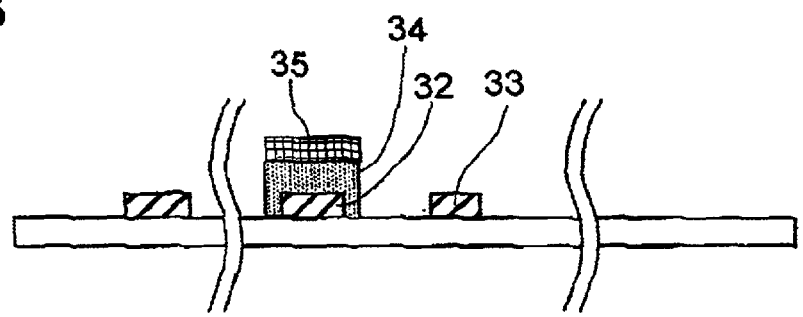

Next, the gas insulating film 34 such as made of SiNx and the undoped a-Si layer 35 are consecutively formed on the entire surface of the panel by a plasma-enhance CFD technique, or the like. The thickness of the SiNx film is preferably about in the range of 0.3 to 0.5 $\mu$m, and the thickness of the undoped a-Si layer is preferably about in the range of 0.05 to 0.2 $\mu$m. After the formation of these films, a resist pattern is formed using a second photolithographic step so as to cover the gate electrode 32. Thereafter, unnecessary portions of the undoped a-Si layer 35 and the gate insulating film 34 are selectively etched by dry etching. Thus, the structure as illustrated in FIG. 8B and FIG. 9B is obtained.

Figure 9C:
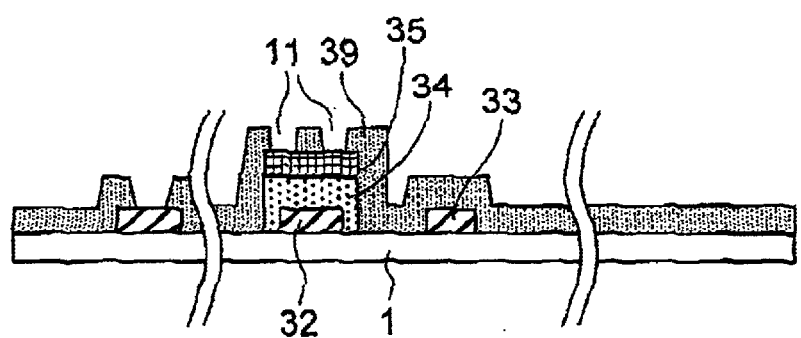

Next, the passivation film 39 such as made SiNx which is to be a channel protection film for pixel TFTs is formed on the entire surface of the panel by a plasma-enhanced CVD technique. with a thickness about in the range of 0.1 to 0.4 $\mu$m. Thereafter, a resist pattern is formed using a third photolithographic step to have openings at source/drain junctions on the undoped a-Si layer 35 and the gate terminal portion. Next, the passivation film 39 is selectively etched by dry or wet etching. Thus, the structure as illustrated in FIG. 8C and FIG. 9C is obtained.

Next, in order to achieve ohmic contact with the undoped a-Si layer 35, the ohmic contact layer 36 made of an impurity-doped n$^+$-type a-Si layer is formed by a CVD technique, for example, in a thickness of 20 to 100 nm. Subsequently, a metallic film to be formed as source/drain electrodes 37 and 38, such as made of Cr, Mo, or Ti, is formed in a thickness of about 0.1 to 0.3 $\mu$m by a sputtering technique. As in the first embodiment, an n$^+$-type layer can be formed, instead of forming the ohmic contact layer 36, by diffusing phosphorus ions into the undoped a-Si layer 35 as a method for obtaining ohmic contact with the undoped a-Si layer 35.

Figure 9D:
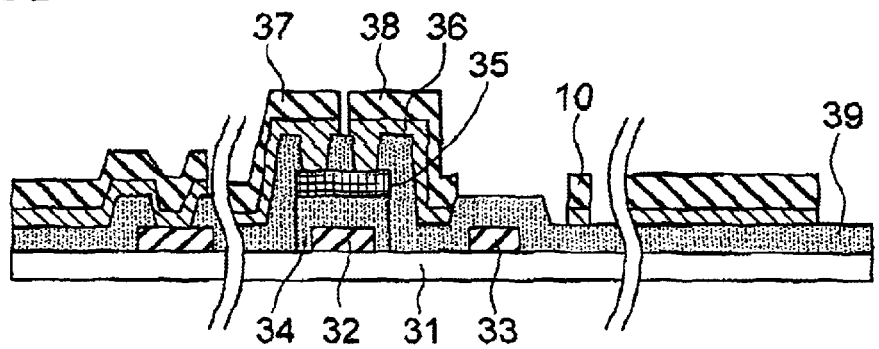

Finally, the source/drain metallic film are selectively etched by using a fourth photolithographic step. Thus, the channel protection type active matrix LCD panel of an in-plane switching mode having the structure as illustrated in FIGS. 8D and 9D can be fabricated.

Accordingly, similarly to the first embodiment, an active matrix LCD panel of an in-plane switching mode, in which the surface of the side walls of the undoped a-Si layer 35 are completely covered by the passivation film 39, can be obtained by using only four photolithographic steps. The method of the present embodiment simplifies the fabrication steps of the in-plane switching mode LCD panel at least by one photolithographic step as compared to the conventional fabrication method.

Figure 10A:
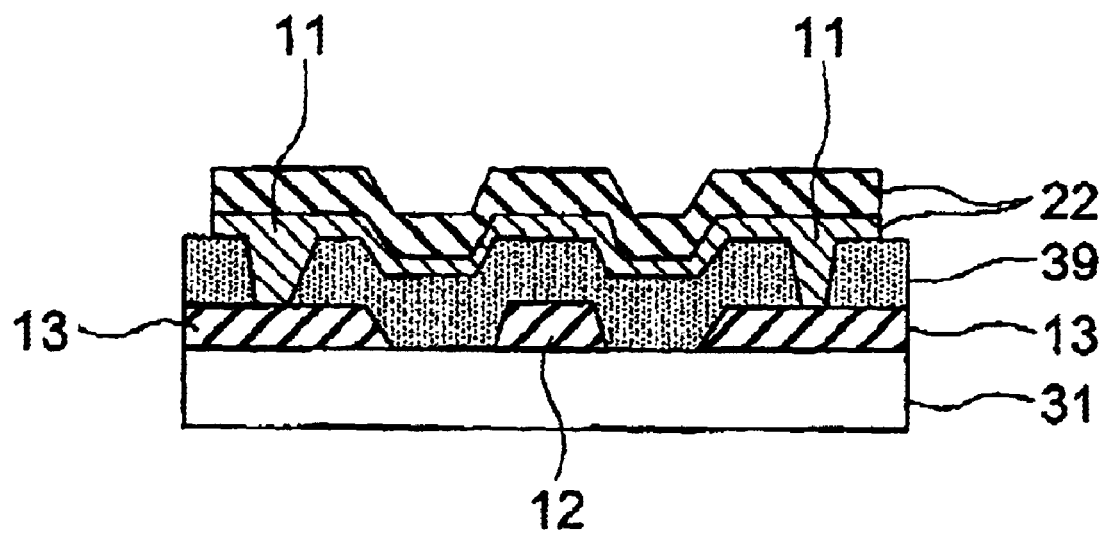
FIGS. 10A and 10B are detailed sectional views of portions of the active matrix LCD panel of the third embodiment.
Figure 10B:
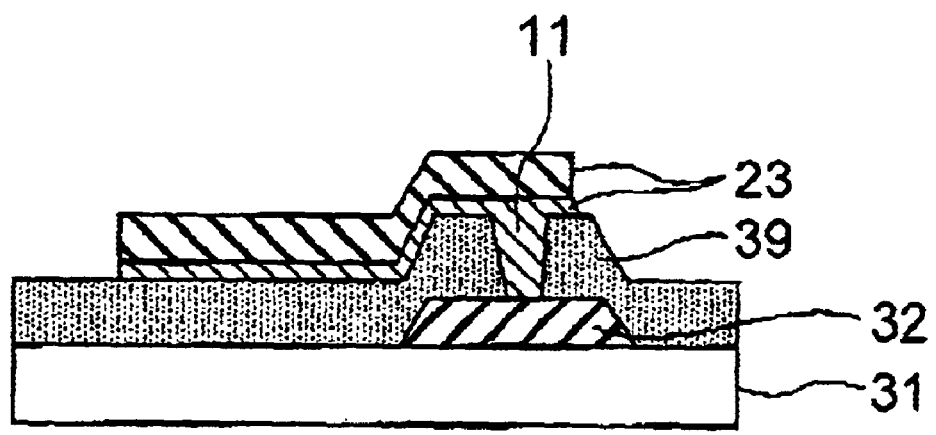
Figure 15A:
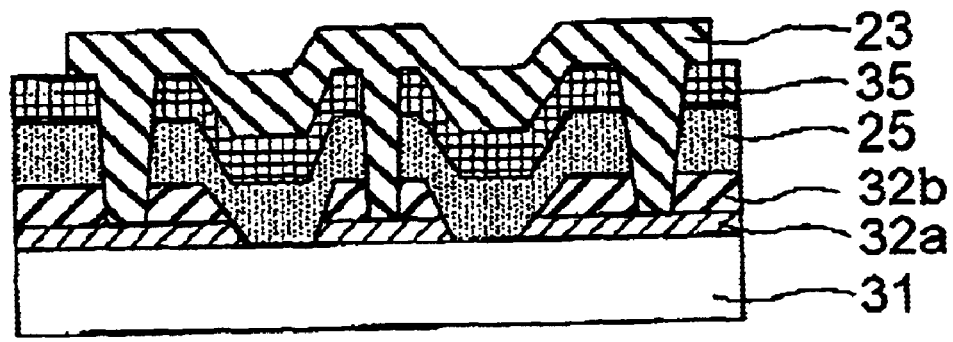
FIG. 15A and 15B are detailed sectional views of portions of a conventional active matrix LCD panel of an in-plane switching mode.
Figure 15B:
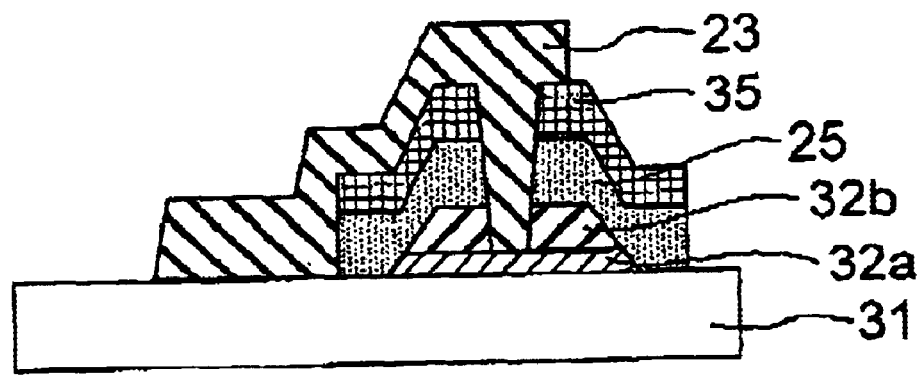

The active matrix LCD panel fabricated by the method of the present embodiment simplifies the connection structure due to the absence of the gate insulating film 34, as shown in FIGS. 10A and 10B, compared to the conventional structure shown in FIGS. 15A and 15B. This is achieved by the step shown in FIG. 8B selectively etching the gate insulating film 34 to obtain the structure shown in FIGS. 10A and 10B.

Moreover, as in the second embodiment, the active matrix LCD panel can be flattend by increasing the thickness of the passivation film, by appropriately changing the SiNx deposition conditions, or by depositing a plurality of films of different materials.

(Embodiment 4)

FIGS. 11A to 11D and FIGS. 12A to 12D show a fabrication steps of an active matrix LCD panel of the present embodiment similarly to FIGS. 3A to 3D and 4A to 4D for the first embodiment. The structure of the active matrix LCD panel of the present embodiment is similar to the third embodiment except for the gate insulating film remaining on the entire panel area in the present embodiment.

Figure 11A:
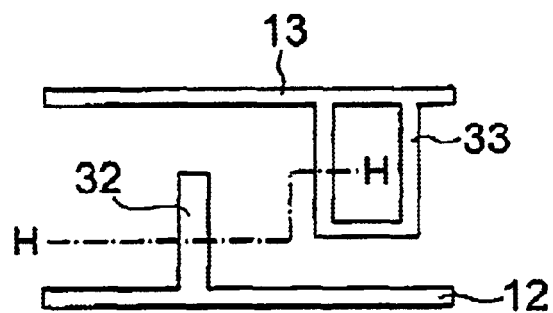
FIGS. 11A to 11D are top plan views of an active matrix LCD panel according to a fourth embodiment of the present invention, consecutively showing fabrication steps thereof.
Figure 11B:
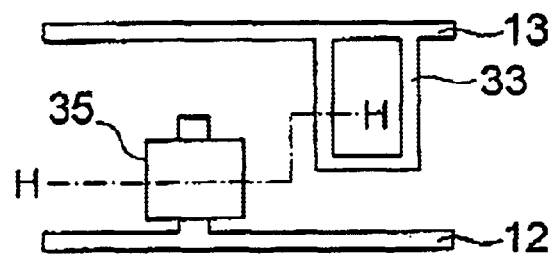
Figure 11C:
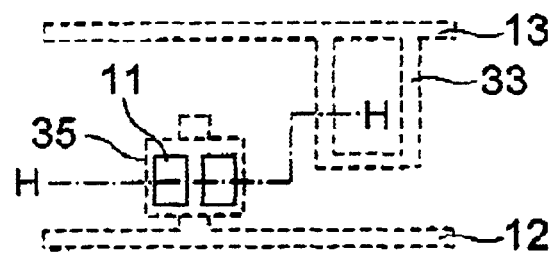

More specifically, in FIGS. 11A and 11B, a metallic film, such as made of Cr, Ti, Mo, or Al, which is to be formed as the common electrode 33 and the gate electrode 32 is deposited on the transparent insulating substrate 31 by a sputtering technique so as to have a thickness in the range of about 0.1 to 0.3 $\mu$m, as in the case of the third embodiment. Thereafter, a patterning step is conducted by using a first photolithographic step.

Figure 12A:
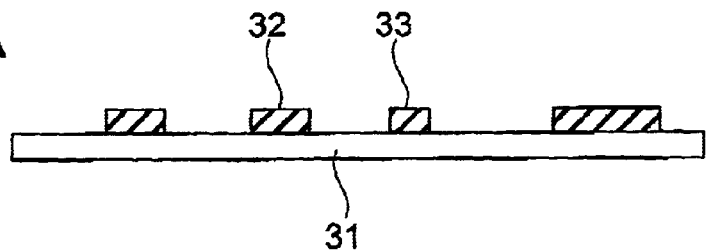
FIGS. 12A to 12D are sectional views taken along line H—H in FIGS. 11A to 11D, respectively.
Figure 12B:
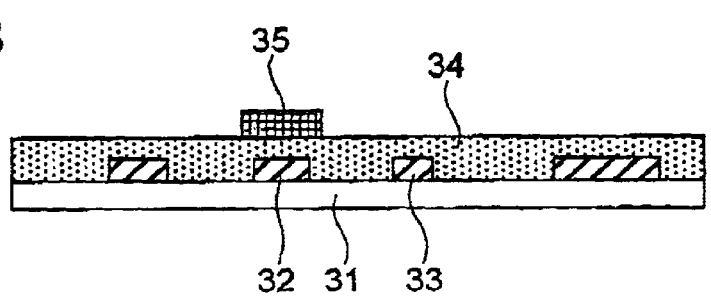
Figure 12C:
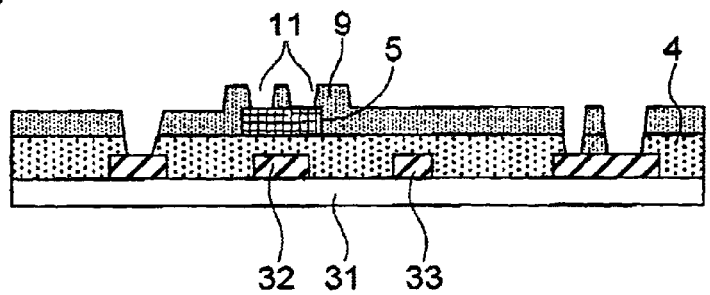

Next, the gate insulating film 34 such as made of SiNx and the undoped a-Si layer 35 which is to be formed as an active layer are consecutively formed on the entire surface of the panel by a plasma-enhance CVD technique, or the like. The thickness of the gate insulating film 34 is about in the range of 0.3 to 0.5 $\mu$m, and the thickness of the undoped a-Si layer 35 is about in the range of 0.05 to 0.2 $\mu$m. In the present embodiment, selective etching is performed by using a second photolithographic step after the formation of these films so that the undoped a-Si layer 35 remains only on the gate electrode 32, and the gate insulating film 34 remains on the entire surface of the panel. As a result, the structure as illustrated in FIGS. 11B and 12B is obtained.

Figure 11D:
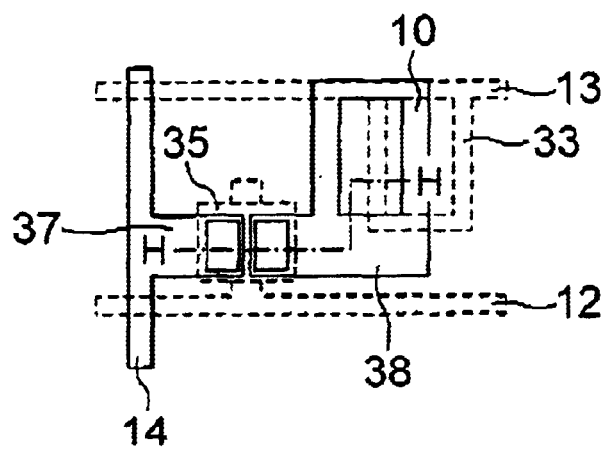
Figure 12D:
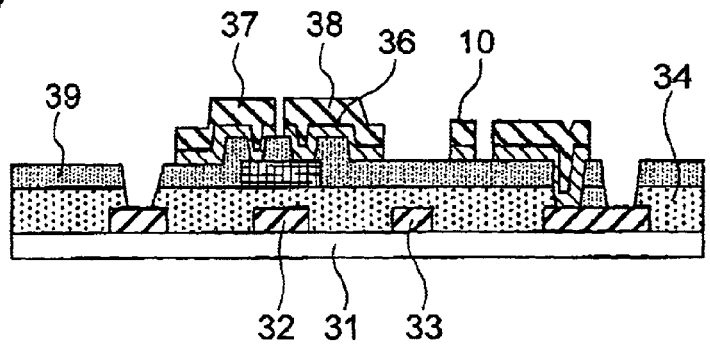

Next, the passivation film 39 such as made of SiNx to be formed as a channel protection film for TFTs is formed on the entire surface of the panel by a plasma-enhanced CVD technique, with a thickness about in the range of 0.1 to 0.4 $\mu$m. Thereafter, a third photolithographic step is conducted to remove the passivation film in the source/drain junction on the undoped a-Si layer 35, and the openings in the gate and drain terminal portions. In the present example, the gate insulating film 34 is left unremoved in the gate and drain terminal portions. By selectively etching the gate insulating film 34, similarly to the precedent embodiment, the structure as illustrated in FIGS. 11D and 12D is obtained.

Next, in order to achieve ohmic contact with the undoped a-Si layer 35, the ohmic contact layer 36 made of n$^+$-type a-Si is formed by a CVD technique, for example, in a thickness of 20 to 100 nm. Subsequently, a metallic film to be formed as source/drain electrodes 37 and 38, such as made of Cr, Mo, Ti, or Al, is formed by a sputtering technique in a thickness of about 0.1 to 0.3 μm. By diffusing phosphorus ions, or the like, into the surface of the undoped a-Si layer 35 to obtain ohmic contact with the undoped a-Si layer 35, a similar structure as in the third embodiment can be obtained.

Finally, unnecessary portions of the source/drain metallic film are etched by using a fourth photolithographic step. Thus, the channel protection type active matrix LCD panel of an in-plane switching mode having the structure as illustrated in FIG. 12D can be obtained.

As with the third embodiment, the fabrication method of the present embodiment can produce the in-plane switching mode active matrix LCD panel, in which the surface and the side walls of the undoped a-Si layer 35 are completely covered by the passivation film 39, by using the four photolithographic steps. The present embodiment can simplify the fabrication steps at least by one photolithographic step as compared to the conventional fabrication method.

Figure 13A:
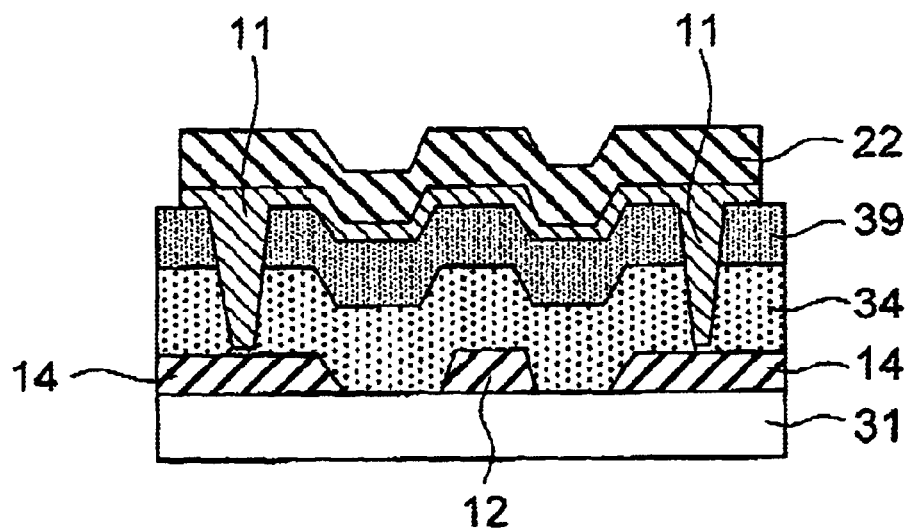
FIGS. 13A and 13B are detailed sectional views of portions of the active matrix LCD panel of the fourth embodiment.
Figure 13B:
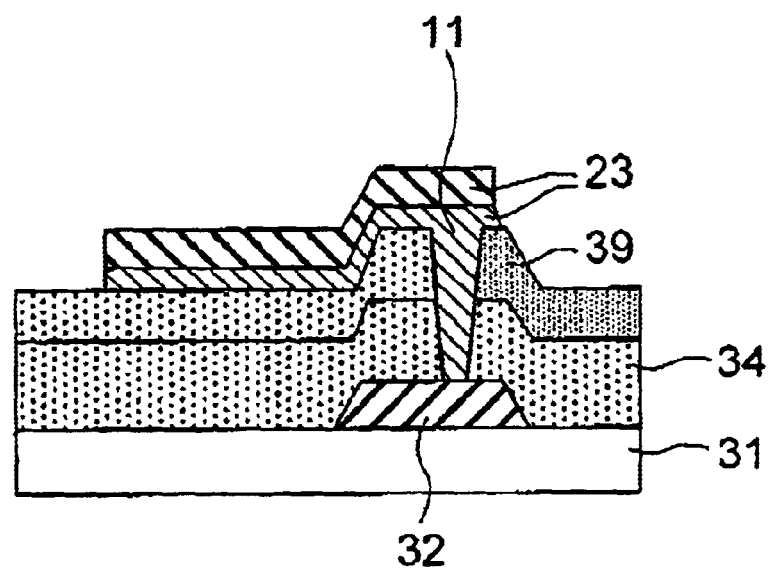

The connection portion of the common line 13 and the gate line 12, the gate electrode 32 and the drain line 14, and the gate line 12 and the source electrode 38 fabricated according to the method of the present embodiment are those as illustrated in FIGS. 13A and 13B. As compared to the third embodiment, since the gate insulating film remains, the thickness of the interlayer dielectric film is increased. Therefore, the effect of reducing a short-circuit defect between the gate and the drain can be obtained.

As described above, according to the present invention, the channel protection type active matrix LCD panel in which the intrinsic a-Si active layer is completely covered by the channel protection film can be fabricated by using the four photolithographic steps. This reduces the costs for the active matrix LCD panel.

This is obtained by the configuration that the passivation film is deposited after etching the gate insulating film and the a-Si active layer all together by using a common photolithographic step, with the a-Si active layer being covered by the passivation film.

Moreover, according to the present invention, level differences in the TFT portion can be reduced by appropriately optimizing the thickness of the passivation film, and thus, a uniform alignment of the liquid crystal layer can be obtained between the active matrix LCD panel and the counter panel.

Furthermore, according to the present invention, it is possible to obtain an active matrix LCD panel in which a storage capacitor, a protection device for preventing electrostatic breakdown, an opening of the gate terminal and the drain terminal, a transfer pad to the common electrode, and the opening portion of the terminal thereof are all provided.

Since the above embodiments are described only for examples, the present invention is not limited to the above embodiments and various modifications or alterations can be easily made therefrom by those skilled in the art without departing from the scope of the present invention.

What is claimed is:

1. An active matrix liquid crystal display panel for use in an active matrix liquid crystal display device, comprising:
   a transparent insulating substrate;
   a plurality of pixels arranged on said transparent insulating substrate and each comprising a pixel electrode and an associated thin film transistor; and
   a passivation layer covering said plurality of pixels,
   said thin film transistor comprising:
      a gate electrode comprising a transparent conductive film and a metallic film consecutively formed on said transparent insulating substrate,
      a gate insulating film covering said gate electrode,
      an island amorphous silicon (a-Si) layer formed on said gate insulating film, and
      source and drain electrodes,
   said passivation layer covering said surfaces and atop surface of said a-Si layer and having openings therein,
   said source and drain electrodes contacting said a-Si layer through the respective openings of said passivation layer,
   said pixel electrode comprising a transparent conductive film formed in a common layer with said transparent conductive film of said gate electrode, and
   said source electrode contacting said transparent conductive film of said pixel electrode through one of said openings in said passivation layer.

2. The active matrix liquid crystal display panel of claim 1, further comprising a gate storage capacitor comprising:
   a gate storage electrode formed in a common layer with said source and drain electrodes,
   said passivation layer; and
   an electrode formed in common with said gate electrode.

3. The active matrix liquid crystal display panel of claim 1, wherein said a-Si layer has a shape substantially the same as a shape of said gate insulating film as viewed in perpendicular to a surface of said transparent insulating substrate.

4. A twisted nematic mode liquid crystal display device comprising the active matrix liquid crystal display panel of claim 1.

5. The active matrix liquid crystal display panel of claim 1, wherein portions of said a-Si layer contacting said source and drain electrodes are heavily doped regions.

6. An active matrix liquid crystal display panel comprising:
   a transparent insulating substrate;
   a plurality of pixels arranged on said transparent insulating substrate and each comprising:
      a pixel electrode;
      a counter electrode; and
      an associated thin film transistor; and
   a passivation layer covering said plurality of pixels,
   said thin film transistor comprising:
      a gate electrode comprising a transparent conductive film and a metallic film consecutively formed on said transparent insulating substrate;
      a gate insulating film covering said gate electrode;
      an island amorphous silicon (a-Si) layer formed on said gate insulating film; and
      source and drain electrodes,
   said passivation layer covering side surfaces and a top surface of said a-Si layer and having openings therein,
   said source and drain electrodes contacting said a-Si layer through the respective openings of said passivation layer, said counter electrode comprising a transparent conductive film formed in a common layer with said transparent conductive film of said gate electrode, said source electrode contacting said transparent conductive film of said pixel electrode through one of said openings in said passivation layer.

7. The active matrix liquid crystal display panel of claim 6, wherein portions of said a-Si layer contacting said source and drain electrodes are heavily doped regions.

8. The active matrix liquid crystal display panel of claim 6, wherein said passivation layer comprises a silicon nitride film and an overlying organic dielectric film.

9. The active matrix liquid crystal display panel of claim 8, wherein said organic dielectric film comprises one of an acrylic resin, benzocyclobutene, and a polyimide.

10. The active matrix liquid crystal display panel of claim 6, wherein said passivation layer comprises a silicon nitride film and an overlying silicon oxide film.

11. The active matrix liquid crystal display panel of claim 1, wherein said drain electrode comprises an oxidized top surface.

12. An active matrix liquid crystal display panel, comprising:

a gate electrode on a substrate;

a pixel electrode on said substrate;

a channel layer over said gate electrode; and a passivation layer on said channel layer and covering a top and sides of said channel layer.

13. The panel of claim 12, further comprising source and drain electrodes on said passivation layer, wherein said channel layer comprises amorphous silicon and said passivation layer comprises silicon nitride.

14. The panel of claim 13, wherein said source and drain electrodes contact said channel layer through openings in said passivation layer.

15. The panel of claim 13, wherein said source electrode contacts said pixel electrode.

16. The panel of claim 15, wherein said source electrode contacts said pixel electrode through an opening in said passivation layer.

17. The panel of claim 12, further comprising a gate insulating layer on said gate electrode.

* * * * *

UNITED STATES PATENT AND TRADEMARK OFFICE
CERTIFICATE OF CORRECTION

PATENT NO. : 6,788,355 B1
APPLICATION NO. : 09/695212
DATED : September 7, 2004
INVENTOR(S) : Satoshi Ihida et al.

Page 1 of 1

It is certified that error appears in the above-identified patent and that said Letters Patent is hereby corrected as shown below:

Title Page, Item (56) References Cited, "Foreign Patent Documents" add:

JP 10-048672   2/1998
JP 10-133227   5/1998
JP 02-019840   1/1990
JP 10-142636   5/1998
JP 10-186407   7/1998

Title Page, Item (56) References Cited, "Other Publications" add:

--Korean Office Action dated September 28, 2002, with partial English translation.--

Signed and Sealed this
Twenty-third Day of August, 2011

David J. Kappos
*Director of the United States Patent and Trademark Office*